United States Patent
Pitz et al.

(10) Patent No.: US 7,454,946 B2
(45) Date of Patent: Nov. 25, 2008

(54) SYSTEMS AND METHODS OF SELF TEST FOR A SLOWLY VARYING SENSOR

(75) Inventors: Jeanne Krayer Pitz, Richardson, TX (US); Ted Lekan, Dallas, TX (US); Michael Vincze, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 429 days.

(21) Appl. No.: 11/390,006

(22) Filed: Mar. 27, 2006

(65) Prior Publication Data

US 2006/0272382 A1 Dec. 7, 2006

Related U.S. Application Data

(62) Division of application No. 11/147,812, filed on Jun. 7, 2005, now Pat. No. 7,032,430.

(51) Int. Cl.
*G01P 21/00* (2006.01)
(52) U.S. Cl. ....................................................... 73/1.37
(58) Field of Classification Search ........................ None
See application file for complete search history.

(56) References Cited

U.S. PATENT DOCUMENTS 5,900,529 A * 5/1999 Hanisko et al. ............... 73/1.38
2005/0038623 A1 * 2/2005 Hammerschmidt ......... 702/118
2005/0140450 A1 6/2005 Pitz ............................ 330/279
2005/0183489 A1 * 8/2005 Weinberg et al. ............. 73/1.38

OTHER PUBLICATIONS

Brandt, Brian P., "Oversampled Analog-To-Digital Conversion" Integrated Circuits Laboratory. 1991: pp. 101-137 and P. 156 (refrence) Ch. 6.

* cited by examiner

*Primary Examiner*—Robert R Raevis
(74) *Attorney, Agent, or Firm*—William B. Kempler; W. James Brady, III; Frederick J. Telecky, Jr.

(57) ABSTRACT

Systems, methods and circuits for implementing a self test in a slowly varying sensor. In one particular case, a circuit is provided that includes two filters operating in parallel. One of the filters is tailored for filtering normal operational signals, and operates at a first oversampling rate. The other filter is tailored for filtering test signals, and operates at a second oversampling rate. The second oversampling rate is generally less than the first oversampling rate. In various cases, the filter tailored for filtering normal operational signals may be programmed for operation across a plurality of oversampling rates.

7 Claims, 4 Drawing Sheets

SYSTEMS AND METHODS OF SELF TEST FOR A SLOWLY VARYING SENSOR

CROSS-REFERENCE OF RELATED APPLICATION

This application is a Divisional Patent Application of U.S. patent application Ser. No. 11/147,812 filed Jun. 7, 2005 now U.S. Pat. No. 7,032,430.

BACKGROUND OF THE INVENTION

The present invention is related to systems and methods for monitoring the operation of a sensor, and in particular to systems and methods for testing the operation of a slowly varying sensor.

Various sensors exist that are capable of providing a digital representation of an analog input signal. These sensors are often very accurate and monitor analog input signals that vary slowly in time. To test such a sensor, a slowly varying test signal is typically applied in place of the analog input signal and the digital output of the sensor is compared with a predicted output value. Where the digital output is within a particular range of the predicted output value, the sensor is determined to be functioning properly. Such a test approach can be problematic. For example, to fully test the sensor may take an undue amount of time due to the slow nature of the input test signal.

Hence, for at least the aforementioned reason, there exists a need in the art for advanced systems and methods for testing such sensors.

BRIEF SUMMARY OF THE INVENTION

The present invention is related to systems and methods for monitoring the operation of a sensor, and in particular to systems and methods for testing the operation of a slowly varying sensor.

Various embodiments of the present invention provide systems for implementing a self test in a slowly varying sensor. Such systems include a normal operation filter and a self test filter. The normal operation filter operates at one oversampling rate tailored for normal operation of the system. The self test filter operates in parallel with the normal operation filter and at another oversampling rate. In one particular case, the oversampling rates are the same, but in other cases the oversampling rate of the normal operation filter is higher than that of the self test filter. Indeed, in some cases, the oversampling rate of the normal operation filter is substantially higher than that of the self test filter. In addition, the systems include a multiplexer that is configured to select between an output of the normal operation filter and an output of the self test filter. The selection is based at least in part on a control signal.

In some instances of the embodiments, the normal operation filter is programmable for operation at various oversampling rates. In one particular case, the self test filter is fixed at a particular oversampling rate while the normal operation filter may be programmed for operation over a range of oversampling rates. In various instances of the embodiments, the systems further include a self test control circuit operable to monitor an output of the self test filter, and to activate/deactivate the control signal based on the monitoring. This monitoring may include either directly or indirectly comparing the self test output with a reference value. Thus, the self test control circuit is operable to select between self test and normal operation through controlling the control signal.

In particular instances of the embodiments, the systems are implemented as part of an acceleration sensor. The acceleration sensor is operable to monitor a normal acceleration signal and a sensor test signal. The frequency of the sensor test signal is substantially higher than the frequency of the normal acceleration signal. In such instances, the systems may further include a self test control circuit that provides the control signal. Upon activating the control signal, the output from the self test filter is selected by the multiplexer, and the sensor test signal is selected for input to the filters. After completion of the self test, the control signal is deactivated, the output from the normal operation filter is selected by the multiplexer, and the sensor normal operation signal is selected for input to the filters.

In some instances of the embodiments, the normal operation filter includes an integration stage driving a differentiation stage. Similarly, the self test filter includes an integration stage driving a differentiation stage. In some cases, the integration stage is common between the normal operation filter and the self test filter, while in other cases the integration stage of the self test filter is separate from the integration stage of the normal operation filter.

Other embodiments of the present invention provide methods for implementing a self test in a slowly varying sensor. Such methods include providing two filters with one of the filters operating at one oversampling rate and providing a first output. The other filter operates in parallel with the first filter and at another oversampling rate. The oversampling rate of this second filter is less than or equal to that of the first filter. The methods further include receiving an input signal at both filters such that the output of each of the filters is based on the input signal. The input signal operates at a frequency that is more adequately monitored by the first filter at the lower oversampling rate. The method includes selection the output of the filter operating at the lower filter rate. In various cases, the filters include integration and differentiation stages. In some cases, a single integration stage is shared between the filters, while in other cases the integration and differentiation stages of the respective filters are separate.

In one particular case of the embodiments, the methods further include providing two primary input signals. One of the primary input signals is a normal operation signal that varies at a first maximum rate, and the other primary input signal is a test signal that varies at a second maximum rate. The second maximum rate is least twice as large as the first maximum rate. In such cases, the methods further include selecting between the primary input signals such that a derivative of the selected primary input signal is the input signal applied to the filters.

In some instances of the embodiments, the methods further include operating both filters in parallel while only the output of one of the filters is selected. Thus, in one case both filters are operated while the output from the filter with the lower oversampling rate is selected. In another case, both filters are operated while the output of the filter with the higher oversampling rate filter is selected. In various cases of the embodiments, the filter exhibiting the higher oversampling rate is programmable for operation at two or more oversampling rates. In such cases, the methods may further include programming the filter to select a desired oversampling rate.

Yet other embodiments of the present invention provide circuits for implementing a self test in a slowly varying sensor. Such circuits include two filters and a multiplexer for selecting between the outputs of the filters. The two filters operate in parallel, and one of the filters operates at an oversampling rate that is equal to or higher than the oversampling rate of the other filter.

This summary provides only a general outline of some embodiments of the present invention. Many other objects, features, advantages and other embodiments of the present invention will become more fully apparent from the following detailed description, the appended claims and the accompanying drawings.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

The present invention is related to systems and methods for monitoring the operation of a sensor, and in particular to systems and methods for testing the operation of a slowly varying sensor.

Various embodiments of the present invention provide circuits, systems and methods for implementing a self test in a slowly varying sensor. Such embodiments include two filters operating in parallel. The two filters receive an input to be monitored, and each of the filters process the input into a respective output. A multiplexer is included that is capable of selecting between the outputs from the respective filters, and providing the selected output for further processing. Where one of the filters operates at a relatively high oversampling rate and the other filter operates at a lower oversampling rate, the multiplexer may be used to select a filter output based upon which oversampling rate best matches the input. In one particular case, one of the filters is a normal operation filter operating at a relatively high oversampling rate, and the other filter is a self test filter operating at a relatively low oversampling rate.

In operation, the input signal may be a slow varying normal operation signal that is adequately detected using the normal operation filter. In contrast, the input signal may be a relatively high frequency self test signal that is more adequately detected using the self test filter with its lower oversampling rate. When this self test signal is provided as an input, the output of the self test filter is selected via a multiplexer, and monitored using a data processing circuit and/or a self test control circuit. When the output derived from the self test signal passes a certain threshold, the test input is turned off and the response of the sensor can be read at the output of the data processing unit. Once the self test response is read, the test is completed and the slow varying normal operation signal is selected in place of the higher frequency input signal to drive both the self test filter and the normal operation filter, and the system is returned to its normal operation mode where the output of the normal operation filter is monitored. In some cases, such an approach of switching between a normal operation filter and a self test filter may be warranted where there is a possibility that the higher frequency self test signal may detrimentally exceed one or more thresholds, and the normal operation filter would not be able to detect the detrimental condition before the system was damaged.

Figure 1:
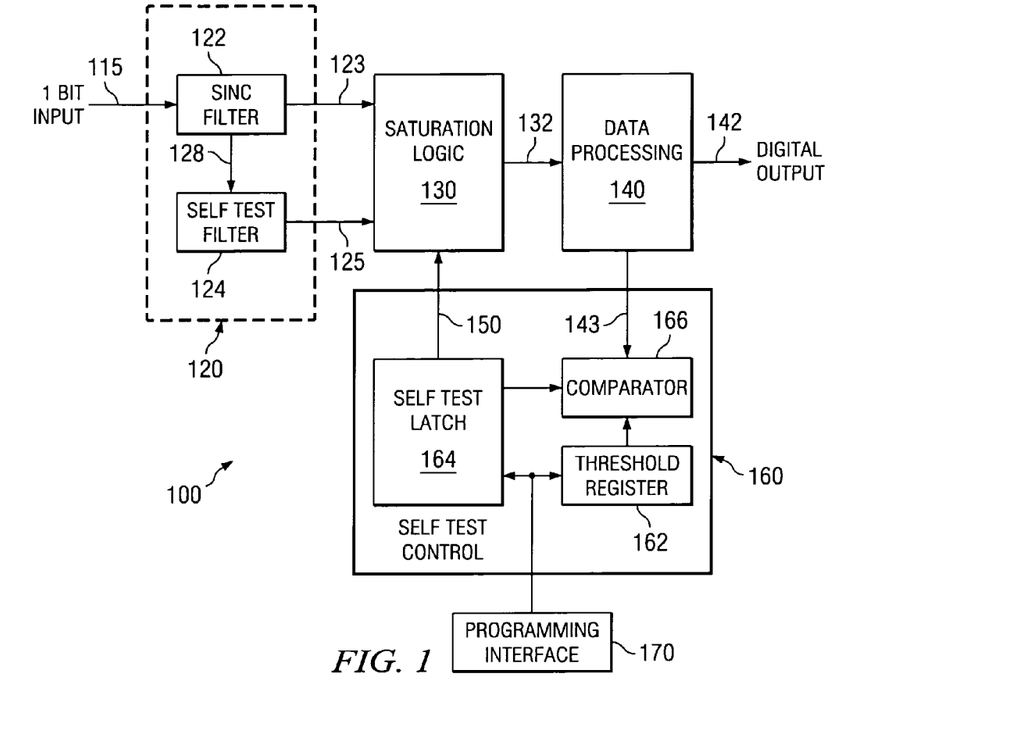
FIG. 1 is a block diagram of a sensor using a parallel filter path in accordance with one or more embodiments of the present invention.

Turning to FIG. 1, a filter system 100 in accordance with various embodiments of the present invention is illustrated. Filter system 100 includes a parallel filter 120, a saturation logic circuit 130, a data processing circuit 140, and a self test control circuit 160. Parallel filter 120 includes a normal operation filter 122 and a self test filter 124. An input 115 is provided to both normal operation filter 122 and self test filter 124, and is used to form a normal output 123 and a self test output 125. In one particular case, input 115 is driven by a sigma delta modulator (not shown) that is part of the ADC or other device associated with filter system 100.

In some cases, normal operation filter 122 can be programmed to have up to sixteen bits of resolution at an oversampling rate of one thousand, twenty-four. In these cases, the oversampling rate can range as low as sixty-four. In one embodiment using a particular clock frequency, the programmability yields a filter response of between five hundred microseconds where the oversampling rate is sixty-four, and eight milliseconds where the oversampling rate is one thousand, twenty-four. In operation, once the resolution of normal operation filter 122 is set it remains static for prolonged periods of operation. In this particular case, self test filter 124 is a fixed filter offering ten bits of resolution at an oversampling rate of sixty-four. Based on the disclosure provided herein, one of ordinary skill in the art will appreciate a variety of oversampling rates and corresponding response times that may be designed as part of normal operation filter 122 in accordance with some embodiments of the present invention. For example, the filter response may be adjusted by using a different clock frequency and/or by adjusting the number of programmable bits offered by normal operation filter 122. Further, based on the disclosure provided herein, one of ordinary skill in the art will appreciate a variety of resolutions and/or oversampling rates that may be designed into self test filter 124 in accordance with various embodiments of the present invention.

In this particular embodiment of the present invention, self test filter 124 and normal operation filter 122 are the same types of filter. The differences between the filters include the response time, the oversampling rate, the resolution, and in some cases the programmability of the filter. In one particular case, both normal operation filter 122 and self test filter 124 are standard sinc filters known in the art. These sinc filters may include an integration stage and a differentiation stage. The size of the registers associated with the integration stage is defined by the following equation:

$$3*\log(\text{Oversampling Rate})/\log(2)+1$$

From the preceding equation, it will be appreciated that the physical size and/or number of transistors used to implement the filters is related to the oversampling rate. In this case, where the maximum oversampling rate of normal operation filter 122 is larger than that of self test filter 124, self test filter 124 may utilize substantially less transistors and/or physical space than that of normal operation filter 122. Thus, implementing parallel filter 120 does not utilize twice the space as normal operation filter 122. Indeed, where the oversampling rate of self test filter 124 is substantially less than that of normal operation filter 122, the space used to implement parallel filter 120 may be only marginally larger than that used for normal operation filter 122 alone.

Normal output 123 from normal operation filter 122 and self test output 125 from self test filter 124 are provided to saturation logic 130. Saturation logic 130 includes a multiplexer that selects between normal output 123 and self test output 125. In addition, saturation logic 130 provides clamping functionality that assures a selected signal does not exceed a defined value. To do so, saturation logic 130 monitors the selected normal output 123 or self test output 125 to determine whether the signal equals the defined value. This defined value may be a maximum value represented by, for example, a thirty-two bit number. When the maximum values has been achieved, a saturation output 132 is maintained at the maximum value until the selected normal output 123 or self test output 125 returns to a value less than the maximum value. Thus, in operation, saturation logic 130 provides either normal operation output 123 or self test output 125 as saturation output 132 based on a self test control signal 150. However, where the selected output exceeds a defined threshold, saturation output 132 is maintained at that threshold as long as the selected output equals or exceeds the threshold.

Data processing circuit 140 may perform data processing of a number of different types. As just one example, data processing circuit 140 performs digital compensation for offset and gain control. As such, data processing circuit 140 may be, but is not limited to an application specific integrated circuit (ASIC) or a digital signal processor (DSP). Data processing circuit provides a digital output 142 and a self test output 143 that are based on input 115. In one particular case, digital output 142 and self test output 143 are the same output. In one particular implementation, data processing circuit 140 provides temperature compensation that is performed on saturation output 132, and a temperature compensated derivative of saturation output 132 is provided as self test output 143. Such temperature compensation may be similar to that described in U.S. patent application Ser. No. 10/749,655, entitled "Digital Compensation for Offset and Gain Correction", and filed Dec. 31, 2003 by Pitz et al. The entirety of the aforementioned application is incorporated herein by reference for all purposes.

Self test control circuit 160 is accessible via a programming interface 170, and receives self test output 143. Self test control circuit 160 includes a self test threshold register 162, a self test latch 164, and a self test comparator 166. In operation, programming interface 170 is used to program a threshold value into self test threshold register 162. In addition, programming interface 170 is used to set self test latch 164 by way of a self test command. When self test latch 164 is set, self test control signal 150 is asserted. Self test latch 164 can be reset either via programming interface 170, or based on a comparison of the threshold value with self test output 143 as provided by self test comparator 166.

When filter system 100 is operating in either a self test mode or a normal operational mode, normal operation filter 122 is receiving and filtering input 115, and providing normal output 123. At the same time, self test filter 124 is receiving and filtering input 115 in parallel to normal operation filter 122, and providing self test output 125. When filter system 100 is operating in normal operation mode, self test latch 164 is not set and self test control signal 150 is de-asserted or deactivated. Based on the de-asserted state of self-test control signal 150, saturation circuit 130 passes normal output 123 on as saturation output 132, and digital output 142 reflects normal operation.

When filter system 100 is operating in the normal operational mode and a self test command is received via programming interface 170, self test latch 164 is set causing self test control signal 150 to assert or activate. Based on the asserted state of self-test control signal 150, saturation circuit 130 passes self test output 125 on as saturation output 132, and digital output 142 reflects the self test operation. At the same time, input 115 may be modified to carry a self test input that is provided to both filters 122, 124. Saturation output 132 is provided to data processing circuit 140 where it is processed and an output representative of the self test input is provided as self test output 143. Self test output 143 is provided to comparator 166 where it is compared against the threshold value maintained in threshold register 162. When self test output 143 exceeds the threshold value, self test latch 164 is reset and self test control signal 150 is de-asserted. Self test latch 164 may also be reset using a stop self test command received via programming interface 170.

Where, self test latch 164 is not reset via programming interface 170 nor does self test output 143 exceed the threshold value, self test latch 164 remains set and the ongoing self test continues. Otherwise, where self test latch 164 is reset, filter system 100 is returned to normal operation. In some cases, a return to normal operation from self test operation by filter system 100 is delayed sufficiently to allow input signal 115 to switch from a relatively high frequency self test signal to a lower frequency normal operation input signal. This delay may be, for example, a fixed number of sample periods based on the resolution of normal operation filter 122. As another example, the delay may based on successive values of self test output 143 being within a certain delta of one another. Based on the disclosure provided herein, one of ordinary skill in the art will appreciate a variety of basis upon which a switch from self test operation to normal operation may be delayed. Further, based on the disclosure provided herein, one of ordinary skill in the art will appreciate that self test output 143 may "exceed" the threshold value where self test output 143 is greater than the threshold value or less than the threshold value depending upon how filter system 100 is designed to operate.

In performing a self test of filter system 100 and/or a sensor or other device associated with filter system 100, it may be desirable to drive input 115 using a relatively high frequency signal. However, such a high frequency input signal may not be adequately detected by normal operation filter 122 due to its slow response. This slow response is related to the oversampling rate programmed into normal operation filter 122, and can vary dramatically depending upon the programmability of normal operation filter 122. For example, in one particular embodiment using a particular clock frequency, normal operation filter 122 may be programmed to operate at one of a variety of oversampling rates from sixty-four to one thousand, twenty-four, with corresponding response times of between five hundred microseconds and eight milliseconds, respectively.

Figure 2A:
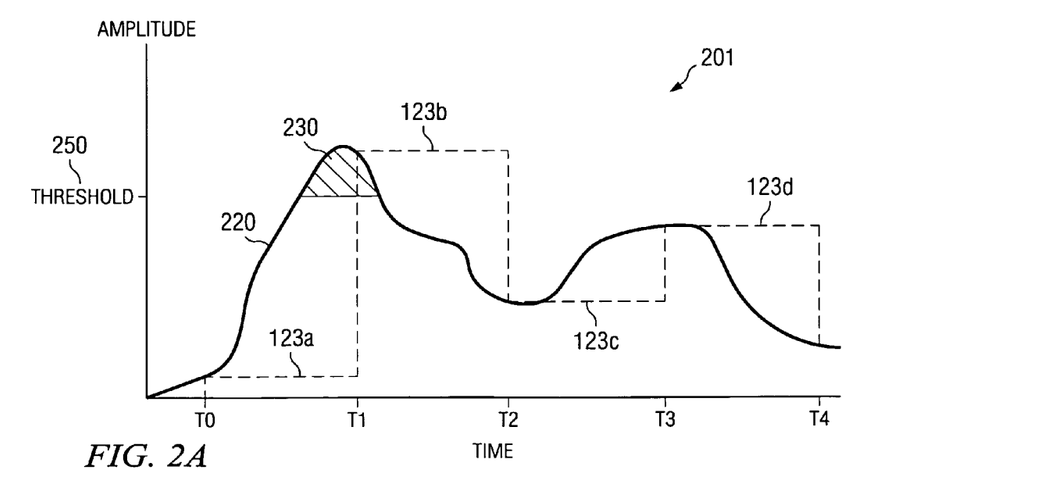
FIGS. 2 are timing diagrams describing the operation of the sensor of FIG. 1.

A visual example of normal operation filter 122 failing to adequately monitor input 115 is provided as a timing diagram 200 of FIG. 2A. Timing diagram 200 depicts an exemplary input signal 220 (corresponding to a self test input signal driving input 115 of FIG. 1) filtered using normal operation filter 122 and providing normal output 123 (shown as a dashed line). For the purpose of this discussion, input signal 220 is randomly chosen to show the operation of filter system 100 where only normal operation filter 122 is available, and where input signal 220 is not changed based on an output from filter system 100. In operation, normal operation filter 122 provides an updated output at a time interval related to its oversampling rate. In this case, the time interval is represented as the respective periods between T0, T1, T2, T3 and T4. In one particular case, the time interval is programmable and ranges between five hundred microseconds and eight milliseconds. At each of the time intervals, normal operation filter 122 responds by updating normal output 123 to reflect input 220. Thus, at time T0, normal output 123 is updated as represented by portion 123a. Similarly, at times T1 through T3 normal output 210 is updated as represented by portions 123b, 123c and 123d, respectively.

Of interest, the response of normal operation filter 122 is sufficiently slow that normal output 123 fails to adequately represent input signal 220. The slow nature of normal operation filter 122 is due to the relatively high oversampling rate that may be programmed into normal operation filter 122. Thus, as an example, a sensor associated with filter system 100 may be damaged due to input signal 220 exceeding a threshold 250 for a substantial amount of time as illustrated by an area 230 defined by input signal 220. As can be appreciated from timing diagram 200, normal operation filter 122 may not be able to detect the excess of input signal 220 before the sensor is damaged. In particular, the excess of input signal 220 is not detected until time T1 after input signal 220 has already peaked.

To reduce the response time of normal operation filter 122 during self test procedures, it is possible to program normal operation filter 122 for operation at a lower oversampling rate. Thus, for example, programming normal operation filter 122 to operate at an oversampling rate of sixty-four instead of one thousand, twenty-four would increase the response of normal operation filter 122 by a factor of sixteen. This may be undesirable, however, as the output of normal operation filter 122 would show abrupt changes unrepresentative of the normal operation. This can be a problem where the response of normal operation filter 122 is to be sensed, and where it is desirable to switch seamlessly back and forth between a normal operation mode and a self test mode without any jumps in the response of the signal due to a change in the oversampling ratio of normal operation filter 122.

Instead of reprogramming normal operation filter 122, self test filter 124 with its lower oversampling rate is used to monitor input signal 115 during self test operations. Self test filter 124 filters input 115 continuously regardless of whether filter system 100 is operating in a self test mode. Because of this continuous operation, an output is always available from self test filter 124 when a self test command is received via programming interface 170. Similarly, while the output of self test filter 124 is being utilized by filter system 100, normal operation filter 122 continues to filter input 115 such that an output of normal operation filter 122 is always available when filter system 100 is switched from self test mode back to normal operation. This provides an ability to sense a response to the input signal as it is transitioned from a self test input signal to a normal operation input signal.

The faster response time of self test filter 124 allows for adequate monitoring of the higher frequency input signal, and for timely comparison of the input signal with the threshold value maintained in threshold register 162. Filter system 100 is maintained in the self test mode until a sensor associated with filter system 100 has returned to normal operation. To reduce the possibility of abrupt changes in digital output 142 when switching from normal operation to self test operation, input signal 115 is filtered by normal operation filter 122 even during the self test operation. In some cases, filter system 100 is switched from the self test operation to normal operation whenever input signal 115 exceeds a defined threshold or whenever a command to return to normal operation is received via programming interface 170.

Figure 2B:
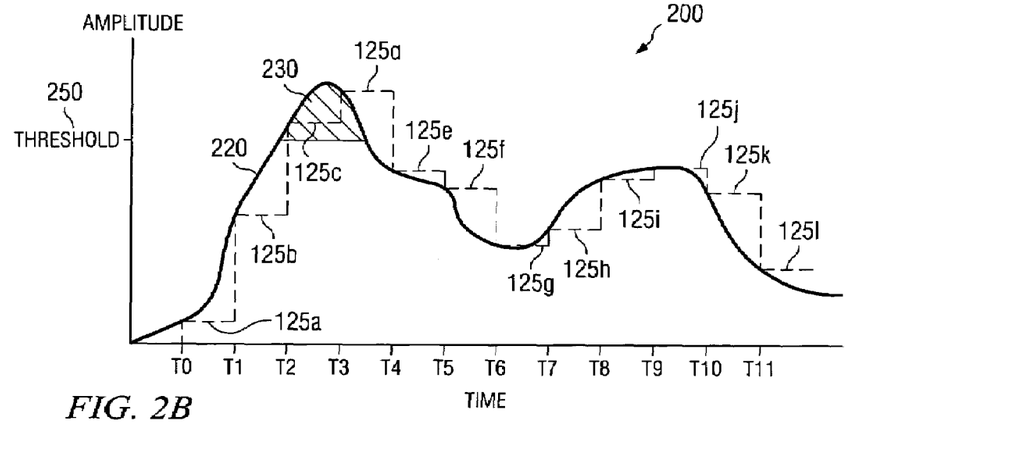

Turning to FIG. 2B, a timing diagram 201 shows an exemplary effect of sampling input signal 220 using self test filter 124. In particular, timing diagram 201 shows input signal 220 in comparison with test output 125 (shown as a dashed line). In operation, self test filter 124 provides an updated output at a time interval related to its oversampling rate. In this case, the time interval is represented as the period between T0 and T1, and repeated for the intervals between time T1 through T11. At each of the time intervals, self test filter 124 responds by updating self test output 125 to reflect input 220. Thus, at time T0, self test output 125 is updated as represented by portion 125a. Similarly, at times T1 through T11 self test output 125 is updated as represented by portions 125b, 125c, 125d, 125e, 125f, 125g, 125h, 125i, 125j, 125k and 125l, respectively. As will be appreciated through comparison of timing diagram 200 and timing diagram 201, detection of input signal 220 exceeding threshold 250 is quicker where self test filter 124 is utilized. In particular, the excess of input signal 220 is detected first at time T2, and then again at time T3.

Figure 2C:
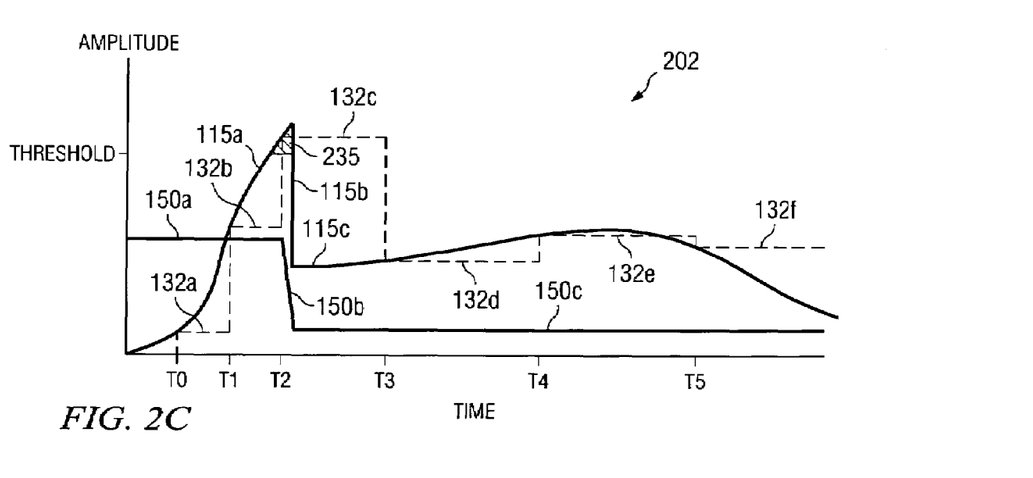

Turning now to FIG. 2C, timing diagram 202 shows the hybrid operation of parallel filter 120 using both normal operation output 123 from normal operation filter 122 and self test output 125 from self test filter 124. Input 115 is shown relative to a self test control 150 and saturation output 132 (shown as a dashed line). At some time prior to time T0, a self test command is received via programming interface 170 causing self test control signal 150a to assert. In this condition, input 115a is a self test input provided by a driving device, and saturation output 132 is selected to be the output of self test filter 124. Thus, during the period that self test control signal 150 is asserted, the interval at which input 115 is monitored is that of self test filter 124. Shortly before time T2, input 115a exceeds threshold 250. This excess condition on input 115a is detected at time T2 through a comparison of self test output 143 with the threshold value (threshold 250) as programmed into threshold register 162. Detection of the excess condition causes self test control circuit 160 to reset self test latch 164 causing self test control signal 150 to transition (shown as portion 150b) from an asserted state (shown as portion 150a) to a de-asserted state (shown as portion 150c).

De-assertion of test control signal 150 (shown as portion 150c) causes a normal operation input from the driving device to drive input 115, and saturation output 132 is selected to be the output of normal operation filter 122. The transition of input 115 from a self test input (shown as portion 115a) to a normal operation input (shown as portion 115c) is noted as a portion 115b. During the period that self test control signal 150 is de-asserted, the interval at which input 115 is monitored is that programmed into normal operation filter 122. The slower response of normal operation filter is reflected by the increased period between times T3 through T5 as compared with the period between times T0 through T2. By switching to the normal operation input 115c from the self test input 115a, the period in which input signal 115 exceeds threshold 250 may be greatly reduced and possibly eliminate any damage to a sensor associated with filter system 100. This excess period is shown as an area 235 under the input signal.

Figure 3A:
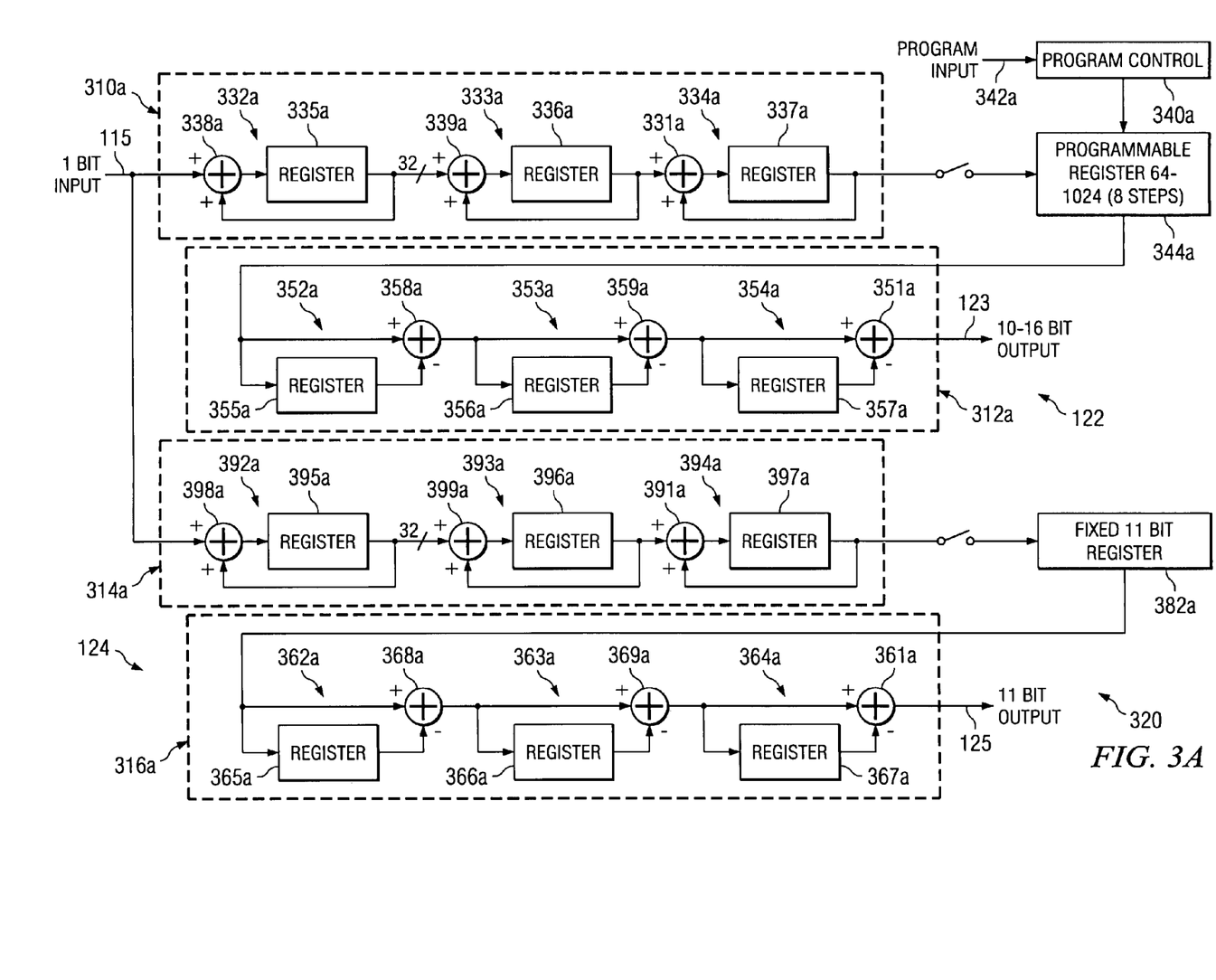
FIG. 3A illustrates a parallel filter with separate integration and differentiation in accordance with some embodiments of the present invention.
Figure 3B:
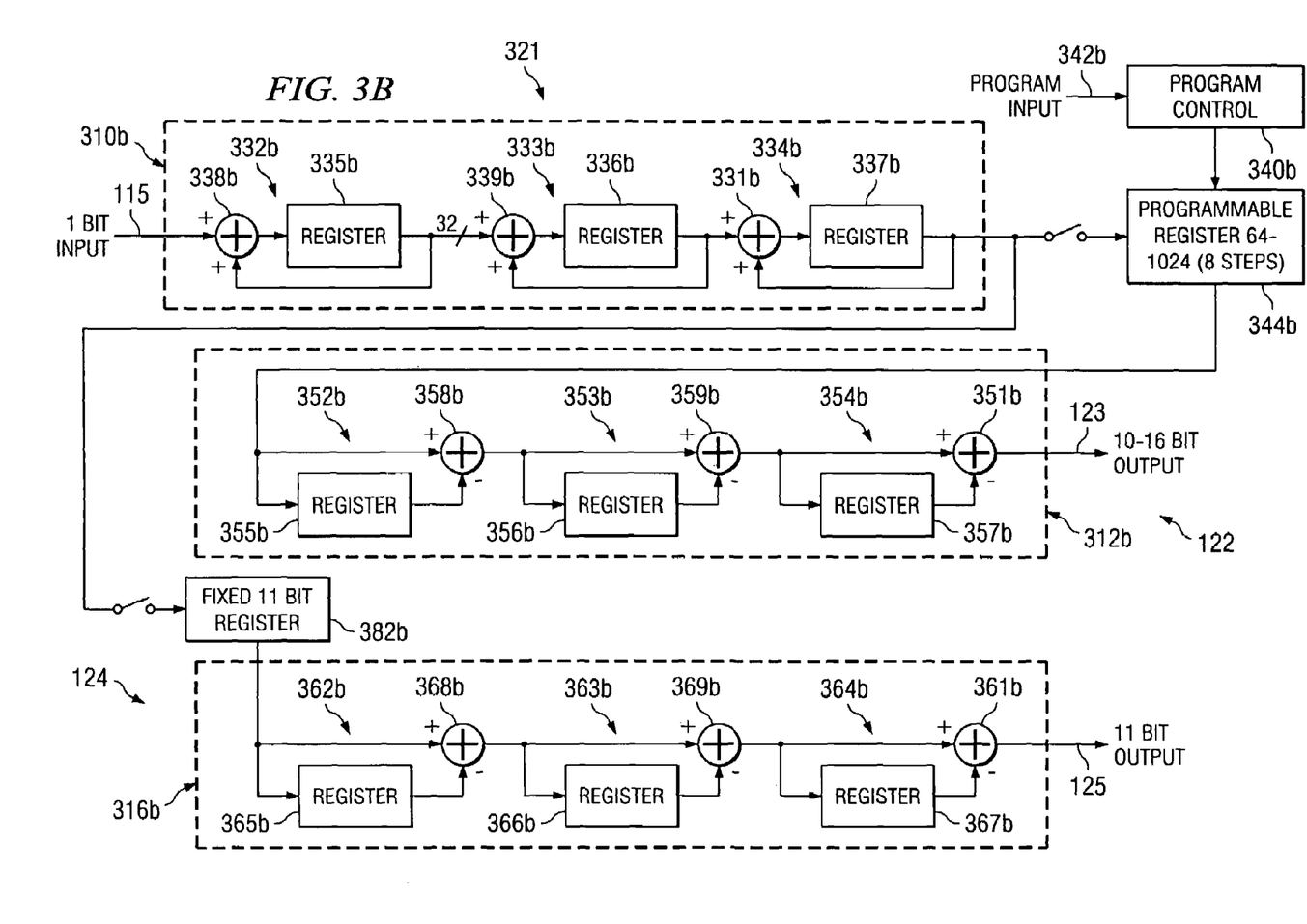
FIG. 3B illustrates another parallel filter with shared integrators and separate differentiators in accordance with other embodiments of the present invention.

Turning to FIGS. 3, different embodiments of parallel filter 120 in accordance with different embodiments of the present invention are depicted. In FIG. 3A, a parallel filter 320 including separate integration stages 310a, 314a and differentiation stages 312a, 316a for both normal operation filter 122 and self test filter 124 is illustrated. As shown, a program input 342a is received by a program control module 340a from programming interface 170a. Based on program input 342a, a programmable register 344a is programmed to select between various oversampling rates available from normal operation filter 122. Again, in one particular embodiment of the present invention, the available oversampling rates extend from sixty-four to one thousand, twenty-four.

Normal operation filter 122 includes an Integration stage 310a with an integrator 332a comprising a register 335a and an adder 338a. Integrator 332a receives input 115 periodically at a defined rate. Register 335a accumulates thirty-two bits and provides its output to a second integrator 333a. Integrator 333a includes a register 336a and an adder 339a. The output of register 336a is provided to a third integrator 334a formed of a register 337a and an adder 331a, and the output of register 337a is provided to differentiator stage 312a in accordance with the programmed oversampling rate maintained in programmable register 344a. Differentiator stage 312a includes three differentiators in serial. In particular, differentiation stage 312a includes a first differentiation stage 352a comprising a register 355a and a subtractor 358a. Differentiation stage 352a drives a differentiation stage 353a formed of a register 356a and a subtractor 359a, and differentiation stage 353a drives a differentiation stage 354a formed of a register 357a and a subtractor 351a. The output of differentiation stage 354a is normal output 123. The resolution of output 123 is dependent upon the oversampling rate programmed via programmable register 344a. As will be appreciated by one of ordinary skill in the art, the previously described filter is commonly described as a decimation filter. The operation of decimation filters is well known in the art.

Self test filter 124 includes an integration stage 314a with an integrator 392a comprising a register 395a and an adder 398a. Similar to normal operation filter 122, integrator 392a receives input 115 periodically at a defined rate. Register 395a accumulates eleven bits and provides its output to a second integrator 393a. Integrator 393a includes a register 396a and an adder 399a. The output of register 396a is provided to a third integrator 394a formed of a register 397a and an adder 391a, and the output of register 397a is provided to differentiator stage 316a in accordance with the fixed ten bit register 382a. Differentiator stage 316a includes three differentiators in serial. In particular, differentiation stage 316a includes a first differentiation stage 362a comprising a register 365a and a subtractor 368a. Differentiation stage 362a drives a differentiation stage 363a formed of a register 366a and a subtractor 369a, differentiation stage 363a drives a differentiation stage 364a formed of a register 367a and a subtractor 361a. The output of differentiation stage 364a is self test output 125. The resolution of self test output 125 is fixed based on the size of register 382a, which in this case is eleven bits.

Turning to FIG. 3B, another parallel filter 321 including an integration stage 310b shared by both normal operation filter 122 and self test filter 124, and separate differentiation stages 312b, 316b for both normal operation filter 122 and self test filter 124 is illustrated. As with parallel filter 320, parallel filter 321 includes a program input 342b that is received by a program control module 340b from programming interface 170a. Based on program input 342b, a programmable register 344b is programmed to select between various oversampling rates available from normal operation filter 122.

For parallel filter 321, normal operation filter 122 including integration stage 310b and differentiation stage 312b operates as described in relation to parallel filter 320 except that integration stage 310b drives differentiation stage 316b in place of input 115. Differentiation stage 316b receives the output of register 337b in accordance with the fixed eleven bit register 382b. Differentiator stage 316b includes three differentiators in serial. In particular, differentiation stage 316b includes a first differentiation stage 362b comprising a register 365b and a subtractor 368b. Differentiation stage 362b drives a differentiation stage 363b formed of a register 366b and a subtractor 369b, and differentiation stage 363b drives a differentiation stage 364b formed of a register 367b and a subtractor 361b. The output of differentiation stage 364b is self test output 125. Similar to parallel filter 320, the resolution of self test output 125 is fixed based on the size of register 382b, which in this case is eleven bits.

Based on the disclosure provided herein, one of ordinary skill in the art will recognize that other filter types may be used to form parallel filter 120 in accordance with different embodiments of the present invention. Thus, for example, where third order filters are described in relation to FIGS. 3, it should be noted that filters of a different order may be utilized. Similarly, where decimation filters are described in relation to FIGS. 3, it will be noted that other filter types might be used based on particular design criteria.

Figure 4:
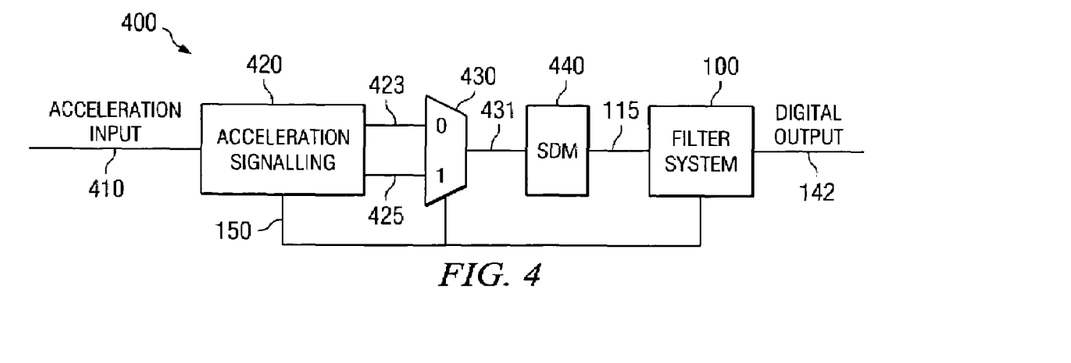
FIG. 4 is a block diagram of an acceleration sensor utilizing a parallel filter in accordance with particular embodiments of the present invention.

Turning to FIG. 4, filter system 100 is shown in relation to an overall acceleration sensor system 400. Sensor system 400 includes an acceleration signaling module 420 operating in relation to filter system 100. In particular, acceleration signaling module 420 receives an acceleration input 410 that is received from, for example, an acceleration control circuit of an automobile. In a typical implementation, acceleration input 410 is an analog signal. Acceleration signaling module 420 provides a normal operation acceleration signal 423 that is derived from acceleration input 410, and a self test acceleration signal 425, Each of normal operation acceleration signal 423 and self test acceleration signal 425 are typically analog signals. Further, in some cases, self test acceleration signal 425 varies at a much higher rate than normal operation acceleration signal 423.

Both normal operation acceleration signal 423 and self test acceleration signal 425 are provided to a multiplexer 430 that selects between the signals and provides an acceleration filter signal 431. Again, acceleration filter signal 431 is typically an analog signal. Acceleration filter signal 431 is provided to a sigma delta modulator 440 which creates a single bit output in the digital domain as input 115. As previously described in relation to FIG. 1 above, input 115 is received by filter 100 and used to form digital output 142. In addition, filter 100 provides self test control signal 150. As shown in FIG. 4, self test control signal 150 is provided to acceleration signaling module 420 where it is used to indicate that self test acceleration signal 425 is to be utilized, and to multiplexer 430 where it is used to control selection between normal operation acceleration signal 423 and self test acceleration signal 425. Based on the disclosure provided herein, one of ordinary skill in the art will appreciate that filter systems in accordance with embodiments of the present invention may be incorporated into sensors or other devices beyond the exemplary acceleration sensor system depicted in FIG. 4.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for implementing a self test in a slowly varying sensor, the method comprising:
   providing a first filter, wherein the first filter operates at a first oversampling rate, and wherein the first filter provides a first output;
   providing a second filter, wherein the second filter operates in parallel with the first filter, wherein the second filter operates at a second oversampling rate, wherein the second oversampling rate is less than the first oversampling rate, and wherein the second filter provides a second output;
   receiving an input signal at both the first filter and the second filter, wherein the first output and the second output are derived from the input signal, wherein the input signal operates at a frequency, and wherein the frequency is more accurately monitored at the second oversampling rate than at the first oversampling rate; and
   selecting the second output.

2. The method of claim 1, wherein the input signal is a selected input signal, and wherein the method further comprises:
   providing a first input signal, wherein the first input signal is a normal operation signal, and wherein the first input signal varies at a first maximum rate;
   providing a second input signal, wherein the second input signal is a test signal, and wherein the test signal varies at a second maximum rate, and wherein the second maximum rate is at least twice as large as the first maximum rate; and
   selecting the second input signal, wherein a derivative of the second input signal is the selected input signal.

3. The method of claim 2, wherein the method further comprises:
   operating both the first filter and the second filter while the second output is selected.

4. The method of claim 3, wherein the method further comprises:
   selecting the first input signal and the first output signal; and
   operating both the first filter and the second filter while the first output is selected.

5. The method of claim 1, wherein the first filter includes an integration stage driving a first differentiation stage, wherein the second filter includes the integration stage driving a second differentiation stage, and wherein the input signal is received by the integration stage.

6. The method of claim 1, wherein the first filter includes a first integration stage driving a first differentiation stage, wherein the second filter includes a second integration stage driving a second differentiation stage, and wherein the input signal is received by both the first integration stage and the second integration stage.

7. The method of claim 1, wherein the first filter is programmable for operation at the first oversampling rate and at a third oversampling rate, wherein the third oversampling rate is less than the first oversampling rate, wherein the third oversampling rate is greater than or equal to the second oversampling rate, and wherein the method further comprises:
   programming the first filter for operation at the third oversampling rate.

* * * * *